United States Patent
Morman et al.

(10) Patent No.: US 10,945,582 B1
(45) Date of Patent: Mar. 16, 2021

(54) CONSUMER APPLIANCES AND METHODS OF OPERATION

(71) Applicant: Haier US Appliance Solutions, Inc., Wilmington, DE (US)

(72) Inventors: Brian J. Morman, Louisville, KY (US); Steven Andrew Rice, Shelbyville, KY (US); Brett Alan Farris, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/662,549

(22) Filed: Oct. 24, 2019

(51) Int. Cl.
*A47L 15/42* (2006.01)
*G05B 19/042* (2006.01)

(52) U.S. Cl.
CPC ........ *A47L 15/4293* (2013.01); *G05B 19/042* (2013.01); *G05B 2219/25092* (2013.01)

(58) Field of Classification Search
CPC .. A47L 15/4293; A47L 15/46; A47L 2301/00; G05B 19/042; G05B 2219/25092
See application file for complete search history.

(56) References Cited

U.S. PATENT DOCUMENTS

| | | | | |
|---|---|---|---|---|
| 5,349,344 A * | 9/1994 | Head | .................... | G05B 19/042 340/4.31 |
| 5,412,291 A * | 5/1995 | Payne | .................. | G05B 19/042 318/102 |
| 5,630,270 A * | 5/1997 | O'Malley | ............ | H05K 1/0266 29/832 |
| 6,393,547 B1 * | 5/2002 | Mason | ................... | H03M 11/24 710/8 |
| 6,515,653 B2 * | 2/2003 | Kao | ........................ | G06F 3/023 345/168 |
| 6,648,981 B2 * | 11/2003 | McIntyre | ............ | A47L 15/4293 134/18 |
| 7,296,236 B2 * | 11/2007 | King | ................... | A47L 15/4293 715/746 |
| 2003/0037806 A1 * | 2/2003 | McIntyre | ................ | A47L 15/46 134/18 |

(Continued)

FOREIGN PATENT DOCUMENTS

| CN | 201812029 U | 4/2011 |
|---|---|---|
| CN | 102750252 A | 10/2012 |

(Continued)

*Primary Examiner* — Thomas D Alunkal
(74) *Attorney, Agent, or Firm* — Dority & Manning, P.A.

(57) ABSTRACT

A consumer appliance, as provided herein, may include a cabinet, a user interface attached to the cabinet, a motor mounted within the cabinet, and a control board in electrical communication with the user interface and the motor. The user interface may include one or more connected electrical elements. The control board may be configured to initiate an initial operation. The initial operation may include activating the control board and detecting the one or more connected electrical elements from a predetermined plurality of potential electrical elements. The initial operation may further include selecting an operating personality from a plurality of preset personalities based on detecting the one or more connected electrical elements. The initial operation may still further include directing the motor according to the selected operating personality.

20 Claims, 4 Drawing Sheets

(56) References Cited

U.S. PATENT DOCUMENTS

| | | | | |
|---|---|---|---|---|
| 2007/0124004 A1* | 5/2007 | King | ..................... | A47L 15/46 |
| | | | | 700/40 |
| 2012/0001099 A1* | 1/2012 | Schenkl | .............. | A47L 15/4297 |
| | | | | 250/574 |
| 2017/0188787 A1* | 7/2017 | Min | ..................... | A47L 15/488 |

FOREIGN PATENT DOCUMENTS

| | | |
|---|---|---|
| CN | 103049072 A | 4/2013 |
| CN | 102750252 B | 6/2016 |
| CN | 206596271 U | 10/2017 |
| KR | 20010038652 A | 5/2001 |

* cited by examiner

CONSUMER APPLIANCES AND METHODS OF OPERATION

FIELD OF THE INVENTION

The present subject matter relates generally to consumer appliances, such as dishwashing appliances, and more particularly to methods for varying the personality settings on a control board thereof.

BACKGROUND OF THE INVENTION

Consumer appliances, such as dishwashing appliances, refrigerator appliances, oven appliances, microwave appliances, washing machine appliances, dryer appliances, etc., generally include one or more components for directing operation of a given consumer appliance. Specifically, a consumer appliance may include a controller having a printed circuit board and memory that is connected to a control pad or panel. Through programmed instructions and input from the control pad, the controller may work with the other components of the appliance to direct operations thereof. For instance, a dishwashing appliance is typically equipped with one or more pumps, such as a circulation pump or a drain pump, for directing or motivating wash fluid from throughout the dishwashing appliance (e.g., to one or more spray assemblies or an area outside of the dishwashing appliance).

Although certain elements or components are common to different models of a particular type of consumer appliance (e.g., dishwashing appliances), many elements and features can vary between different models (e.g., based on the size, capacity, or features of each model). As an example, some dishwashing appliance models include multiple pumps (e.g., a circulation pump and a drain pump) each having its own discrete motor. By contrast, other dishwashing appliance models include multiple pumps selectively or separately driven by a single motor. The size or output capacity of the pump motors in different dishwashing appliance models may further vary or be the same. As another example, unique heating elements may be provided in different models of dishwashing appliances. As yet another example, different models of dishwashing appliances may include different numbers of input or output elements (e.g., buttons, switches, light emitting diodes, etc.) The operation or functionality of even the common elements (e.g., a motor or pump) shared by multiple models of dishwashing appliances may be affected by the presence or operation of the varied elements. In order to address such variations, the control board of a given model of dishwashing appliance is generally programmed with a specific personality (e.g., relating to motor operation, heater operation, or user interface operation) that is tailored to that same model of dishwashing appliance.

In some instances, it may be useful to use a single type of control board across multiple unique models of an appliance. For instance, it may be cheaper or easier to manufacture a single type of control board for different models of an appliance. The single type of control board may include multiple different personalities (e.g., discrete personalities that correspond to different models of dishwashing appliances). During installation of the control board, the installer or manufacturer will generally select a specific personality according to which model of the appliance the control board in being installed into.

Although it may be desirable to have multiple different personalities on a single control board, this presents some difficulties. For instance, the installer is typically being relied upon to know and remember the exact model into which the control board is being installed. Moreover, the installer is typically being relied upon to choose the correct personality. In some existing appliances, the choice is made by manually engaging one or more pins on the control board that correspond to a specific personality. In other existing appliances, the choice is made by manually providing a set number or capacity of resistors on the control board that correspond to a specific personality (i.e., such that the resistance rating indicates the personality setting). Such manual selections of a personality can be time-consuming, difficult, or expensive. Furthermore, if the installer chooses the wrong personality setting, the appliance may fail to operate as intended.

As a result, there is a need for improved consumer appliances (e.g., dishwashing appliances) or methods to select a correct personality setting on a particular appliance.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a consumer appliance is provided. The method may include activating a control board within the consumer appliance and detecting one or more connected electrical elements from a predetermined plurality of potential electrical elements. The method may further include selecting an operating personality from a plurality of preset personalities based on detecting the one or more connected electrical elements. The method may still further include directing a motor of the consumer appliance according to the selected operating personality.

In another exemplary aspect of the present disclosure, a consumer appliance is provided. The consumer appliance may include a cabinet, a user interface attached to the cabinet, a motor mounted within the cabinet, and a control board in electrical communication with the user interface and the motor. The user interface may include one or more connected electrical elements. The control board may be configured to initiate an initial operation. The initial operation may include activating the control board and detecting the one or more connected electrical elements from a predetermined plurality of potential electrical elements. The initial operation may further include selecting an operating personality from a plurality of preset personalities based on detecting the one or more connected electrical elements. The initial operation may still further include directing the motor according to the selected operating personality.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 1:
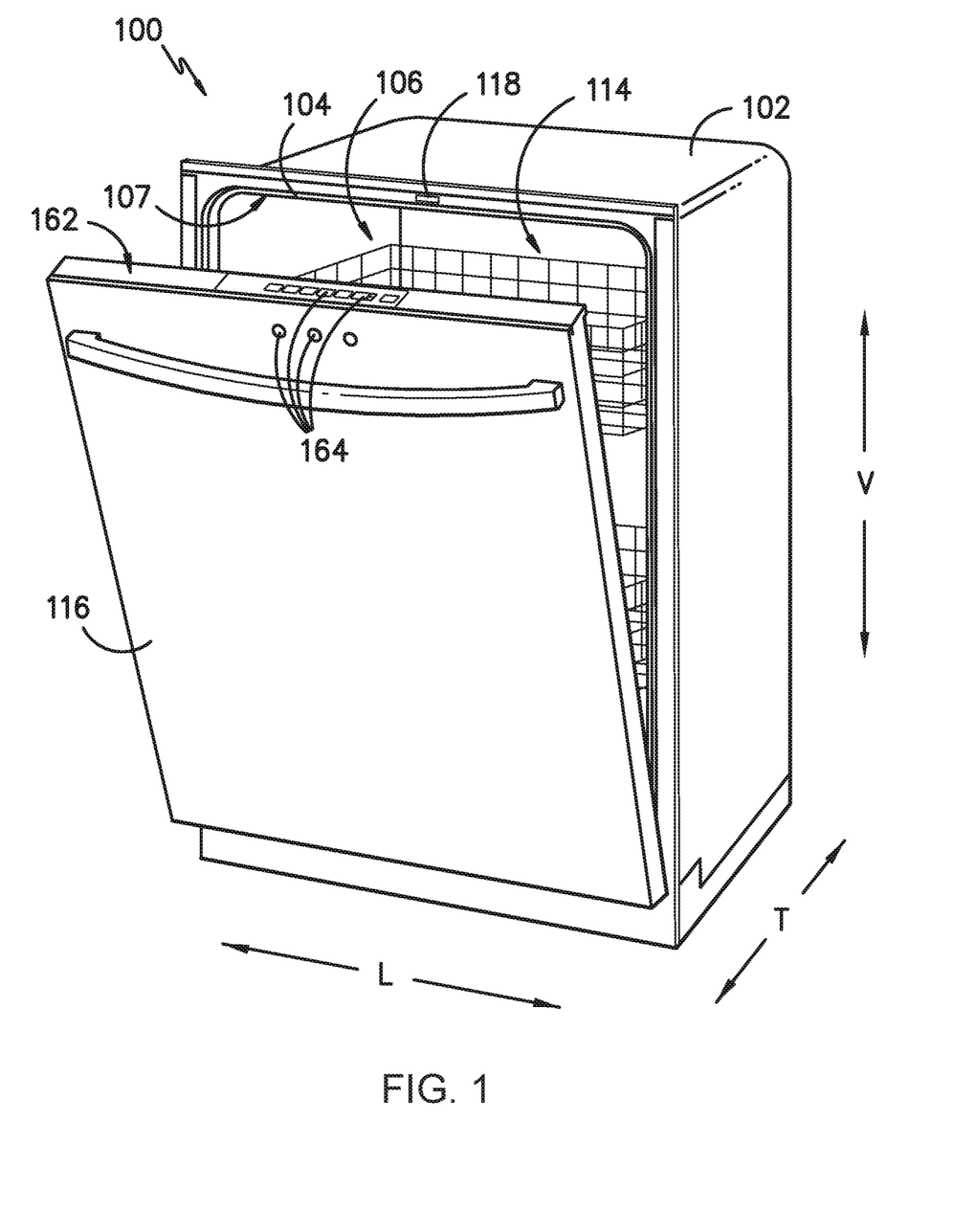
FIG. 1 provides a perspective view of an exemplary embodiment of a dishwashing appliance of the present disclosure with a door in a partially open position.
Figure 2:
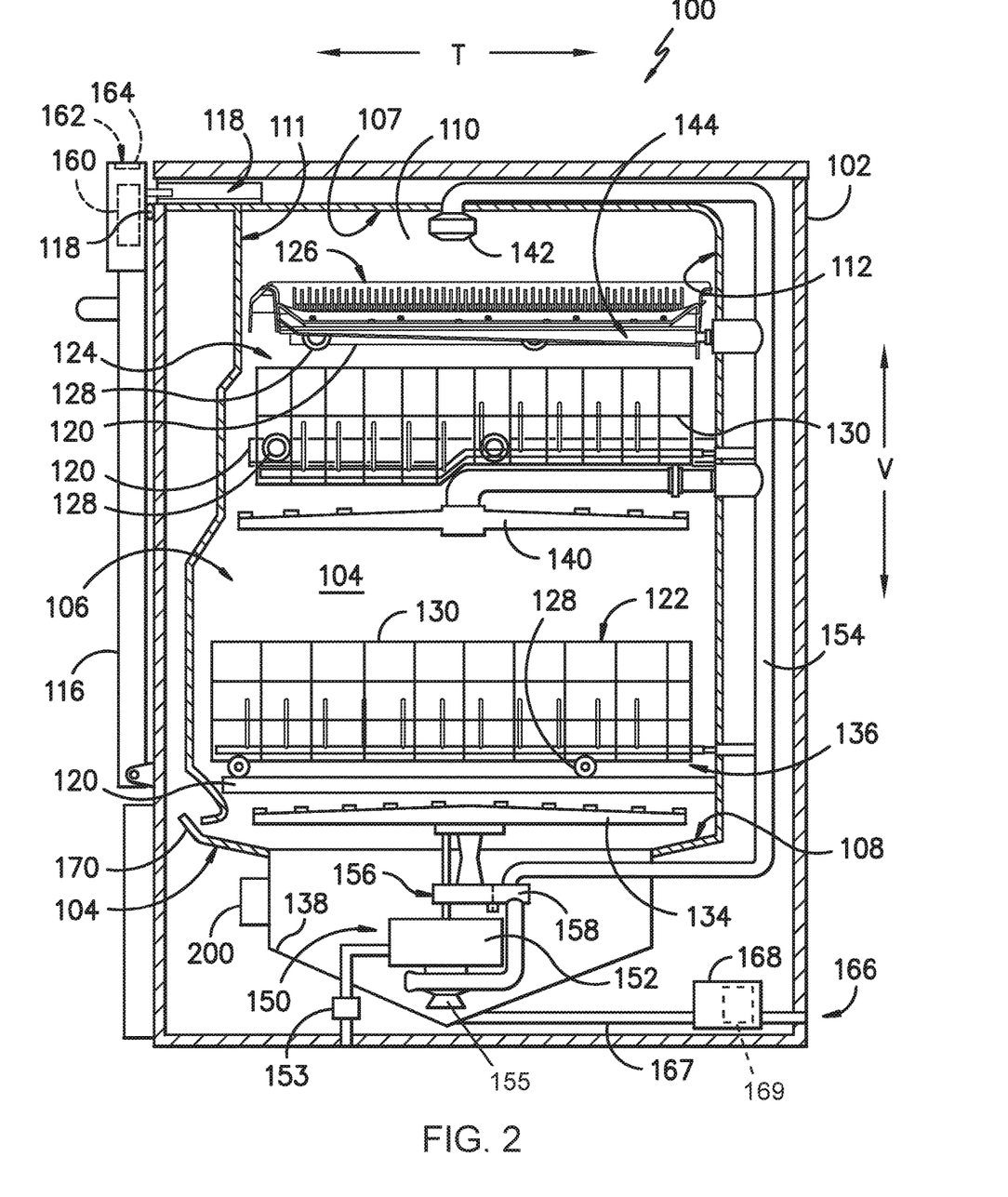
FIG. 2 provides a side, cross sectional view of the exemplary dishwashing appliance of FIG. 1.

Turning now to the figures, FIGS. 1 and 2 depict an exemplary consumer appliance (e.g., dishwasher 100) that may be configured in accordance with aspects of the present disclosure. Generally, dishwasher 100 includes a cabinet 102 that defines a vertical direction V, a lateral direction L, and a transverse direction T. Each of the vertical direction V, lateral direction L, and transverse direction T are mutually perpendicular to one another and form an orthogonal direction system.

Dishwasher 100 includes a tub 104 within cabinet 102 that defines a wash chamber 106. As shown, tub 104 extends between a top 107 and a bottom 108 along the vertical direction V, between a pair of side walls 110 along the lateral direction L, and between a front side 111 and a rear side 112 along the transverse direction T.

Tub 104 includes a front opening 114. In some embodiments, a door 116 hinged at its bottom for movement between a normally closed vertical position, wherein the wash chamber 106 is sealed shut for washing operation, and a horizontal open position for loading and unloading of articles from dishwasher 100. A door closure mechanism or assembly 118 may be provided to lock and unlock door 116 for accessing and sealing wash chamber 106.

In exemplary embodiments, tub side walls 110 accommodate a plurality of rack assemblies. For instance, guide rails 120 may be mounted to side walls 110 for supporting a lower rack assembly 122, a middle rack assembly 124, or an upper rack assembly 126. In some such embodiments, upper rack assembly 126 is positioned at a top portion of wash chamber 106 above middle rack assembly 124, which is positioned above lower rack assembly 122 along the vertical direction V.

Generally, each rack assembly 122, 124, 126 may be adapted for movement between an extended loading position (not shown) in which the rack is substantially positioned outside the wash chamber 106, and a retracted position (shown in FIGS. 1 and 2) in which the rack is located inside the wash chamber 106. In some embodiments, movement is facilitated, for instance, by rollers 128 mounted onto rack assemblies 122, 124, 126, respectively.

Although guide rails 120 and rollers 128 are illustrated herein as facilitating movement of the respective rack assemblies 122, 124, 126, it should be appreciated that any suitable sliding mechanism or member may be used according to alternative embodiments.

In optional embodiments, some or all of the rack assemblies 122, 124, 126 are fabricated into lattice structures including a plurality of wires or elongated members 130 (for clarity of illustration, not all elongated members making up rack assemblies 122, 124, 126 are shown). In this regard, rack assemblies 122, 124, 126 are generally configured for supporting articles within wash chamber 106 while allowing a flow of wash fluid to reach and impinge on those articles (e.g., during a cleaning or rinsing cycle). According to additional or alternative embodiments, a silverware basket (not shown) is removably attached to a rack assembly (e.g., lower rack assembly 122), for placement of silverware, utensils, and the like, that are otherwise too small to be accommodated by the rack assembly.

Generally, dishwasher 100 includes one or more spray assemblies for urging a flow of fluid (e.g., wash fluid) onto the articles placed within wash chamber 106.

In exemplary embodiments, dishwasher 100 includes a lower spray arm assembly 134 disposed in a lower region 136 of wash chamber 106 and above a sump 138 so as to rotate in relatively close proximity to lower rack assembly 122.

In additional or alternative embodiments, a mid-level spray arm assembly 140 is located in an upper region of wash chamber 106 (e.g., below and in close proximity to middle rack assembly 124). In this regard, mid-level spray arm assembly 140 may generally be configured for urging a flow of wash fluid up through middle rack assembly 124 and upper rack assembly 126.

In further additional or alternative embodiments, an upper spray assembly 142 is located above upper rack assembly 126 along the vertical direction V. In this manner, upper spray assembly 142 may be generally configured for urging or cascading a flow of wash fluid downward over rack assemblies 122, 124, and 126.

In yet further additional or alternative embodiments, upper rack assembly 126 may further define an integral spray manifold 144. As illustrated, integral spray manifold 144 may be directed upward, and thus generally configured for urging a flow of wash fluid substantially upward along the vertical direction V through upper rack assembly 126.

The various spray assemblies and manifolds described herein may be part of a fluid distribution system or fluid circulation assembly 150 for circulating wash fluid in tub 104. In certain embodiments, fluid circulation assembly 150 includes a circulation pump 152 for circulating wash fluid in tub 104. Circulation pump 152 may be located within sump 138 or within a machinery compartment located below sump 138 of tub 104. In certain embodiments, circulation pump 152 includes a dedicated circulation motor 155 configured to selectively drive or motivate pump rotation, as is understood.

When assembled, circulation pump 152 may be in fluid communication with an external water supply line (not shown) and sump 138. A water inlet valve 153 can be positioned between the external water supply line and circulation pump 152 (e.g., to selectively allow water to flow from the external water supply line to circulation pump 152). Additionally or alternatively, water inlet valve 153 can be positioned between the external water supply line and sump 138 (e.g., to selectively allow water to flow from the external water supply line to sump 138). During use, water inlet valve 153 may be selectively controlled to open to allow the flow of water into dishwasher 100 and may be selectively controlled to cease the flow of water into dishwasher 100. Further, fluid circulation assembly 150 may include one or more fluid conduits or circulation piping for directing wash fluid from circulation pump 152 to the various spray assemblies and manifolds. In exemplary embodiments, such as that shown in FIG. 2, a primary supply conduit 154 extends from circulation pump 152, along rear 112 of tub 104 along the vertical direction V to supply wash fluid throughout wash chamber 106. Optionally, the circulation pump 152 or circulation motor 155 (e.g., presence, size, load capacity, type, etc.) may be dictated by or correspond to the exact model of an individual dishwasher. Thus, different models of the dishwasher may include different arrangements or configurations of circulation pump 152 or circulation motor 155.

In some embodiments, primary supply conduit 154 is used to supply wash fluid to one or more spray assemblies (e.g., to mid-level spray arm assembly 140 or upper spray assembly 142). It should be appreciated, however, that according to alternative embodiments, any other suitable plumbing configuration may be used to supply wash fluid throughout the various spray manifolds and assemblies described herein. For instance, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher 100.

Each spray arm assembly 134, 140, 142 integral spray manifold 144, or other spray device may include an arrangement of discharge ports or orifices for directing wash fluid received from circulation pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray assemblies 134, 140, 142 may be motor-driven, or may operate using any other suitable drive mechanism. Spray manifolds and assemblies may also be stationary. The resultant movement of the spray assemblies 134, 140, 142 and the spray from fixed manifolds provides coverage of dishes and other dishwasher contents with a washing spray. Other configurations of spray assemblies may be used as well. For instance, dishwasher 100 may have additional spray assemblies for cleaning silverware, for scouring casserole dishes, for spraying pots and pans, for cleaning bottles, etc. Optionally, the number and type of spray assemblies may be dictated by or correspond to the exact model of an individual dishwasher. Thus, different models of the dishwasher may include different arrangements or configurations of spray assemblies.

In operation, circulation pump 152 draws wash fluid in from sump 138 and pumps it to a diverter 156 (e.g., which is positioned within sump 138 of dishwasher 100). Diverter 156 may include a diverter disk (not shown) disposed within a diverter chamber 158 for selectively distributing the wash fluid to the spray arm assemblies 134, 140, 142 and/or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter 156 is configured for selectively distributing the flow of wash fluid from circulation pump 152 to various fluid supply conduits, only some of which are illustrated in FIG. 2 for clarity. For instance, diverter 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level or upper spray assemblies 140, 142 (e.g., such as primary supply conduit 154). Optionally, the presence or configuration (e.g., number or size of apertures) of diverter 156 may be dictated by or correspond to the exact model of an individual dishwasher. Thus, different models of the dishwasher may include different arrangements or configurations of diverters.

Drainage of soiled wash fluid within sump 138 may occur, for example, through drain assembly 166. In particular, wash fluid may exit sump through a drain and may flow through a drain conduit 167. In certain embodiments, a drain pump 168 can facilitate drainage of the soiled wash fluid by pumping the wash fluid to a drain line external to dishwasher 100. In optional embodiments, drain pump 168 includes a dedicated drain motor 169 configured to selectively drive or motivate pump rotation, as is understood. In alternative embodiments, however, drain pump 168 shares a common motor with, for instance, circulation pump 152. The shared motor may thus selectively and alternately motivate either circulation pump 152 or drain pump 168. Optionally, the drain pump 168 or drain motor 169 (e.g., presence, size, load capacity, type, etc.) may be dictated by or correspond to the exact model of an individual dishwasher. Thus, different models of the dishwasher may include different arrangements or configurations of drain pump 168 or drain motor 169.

In optional embodiments, one or more condition sensors 200 are mounted within cabinet 102 to detect one or more corresponding conditions therein (e.g., during operation of dishwasher 100). Such sensors 200 may include or be provided as any suitable electrically-readable sensing device for detecting temperature (e.g., thermistor or thermocouple), pressure (e.g., diaphragm sensor), or another relevant condition for directing operation of dishwasher 100. Optionally, the presence or configuration (e.g., type, position, number, etc.) of sensors 200 may be dictated by or correspond to the exact model of an individual dishwasher. Thus, different models of the dishwasher may include different arrangements or configurations of electrical sensors.

Dishwasher 100 is equipped with a control board or controller 160 to direct or regulate operation of dishwasher 100. Controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH.

Generally, controller 160 is in communication (e.g., electrical or wireless communication) with various operational components (e.g., motor 155, motor 169, valve 153, diverter 156, or sensor 200) of dishwasher 100. Controller 160 may be positioned in a variety of locations throughout dishwasher 100. In the illustrated embodiment, controller 160 may be located within a control panel area of door 116 as shown in FIGS. 1 and 2. In such an embodiment, input/output ("I/O") signals may be routed between the controller 160 and operational components of dishwasher 100 along wiring harnesses that may be routed through the bottom of door 116.

Among the components connected to controller 160, the controller 160 is in electrical communication with a user interface 162 through which a user may select various operational features and modes and monitor progress of dishwasher 100. User interface 162 generally includes multiple electric elements that can be selectively activated, directed, or driven by controller 160. In some embodiments, the user interface 162 may represent a general purpose I/O ("GPIO") device or functional block. In additional or alternative embodiments, the user interface 162 may include input components, such as one or more of a variety of electrical, mechanical or electro-mechanical input devices including rotary dials, push buttons, and touch pads.

Separate from or in addition to the input components, the user interface 162 includes a plurality of a display components 164 to provide operational feedback to a user. For instance, one or more (e.g., all or a mere sub-portion of) display components 164 may include or be provided as a light emitting diode (LED). The user interface 162, including multiple display components 164, may be in communication with the controller 160 via one or more signal lines or shared communication busses. In some instances, the number of display components 164 (e.g., LEDs) may correspond to the exact model of dishwasher 100. In other words, one model of dishwasher 100 may include a higher number of display components 164 than another distinct model of dishwasher 100.

Figure 4:
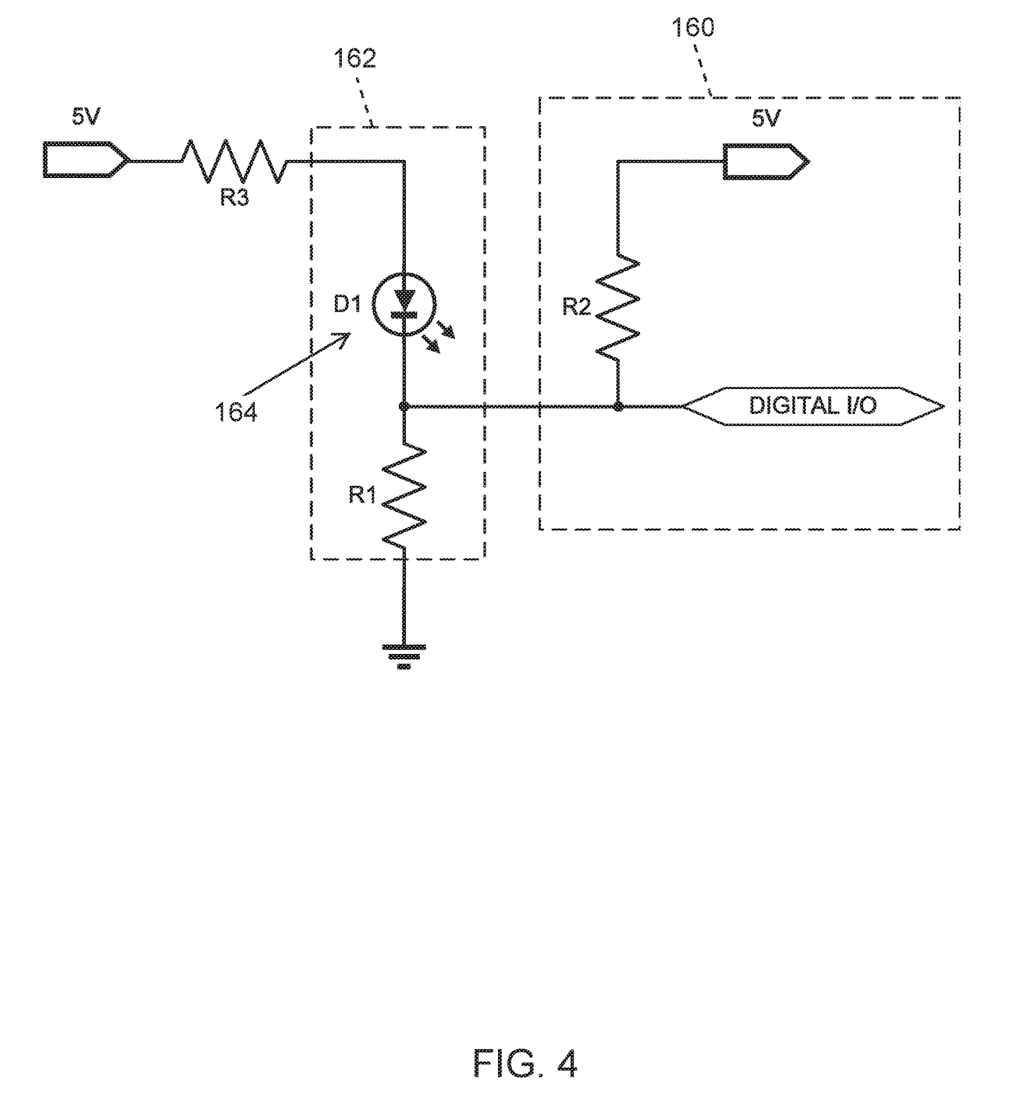
FIG. 4 provides a schematic diagram of a portion of a control board according to exemplary embodiments of the present disclosure.

Turning especially to FIG. 4, an schematic view is provided to illustrate an electrical connection between an individual display component 164 (e.g., of a plurality of display components 164—FIG. 1) and controller 160. As shown, an individual display component 164 may include or be provided as a diode, such as a photodiode or light emitting diode (LED). Moreover, the individual display component 164 may be connected (e.g., electrically connected) to a corresponding connection pin on controller 160. During use, controller 160 may direct an electrical current to the corresponding connection pin (e.g., at a preset voltage, such as 5V). For example, the electrical current may be directed as an initial current or signal during a startup operation of dishwasher 100 (FIG. 1) (e.g., the first time or instance in which power is supplied to controller 160). If and when the individual display component 164 is connected to controller 160 at the corresponding connection pin (i.e., fills the corresponding connection pin), controller 160 may detect a predetermined voltage drop at the corresponding connection pin. In other words, controller 160 may detect that the voltage of the electrical current has been reduced by the predetermined voltage drop, which corresponds to a drop in voltage caused by the individual display component 164. If and when the individual display component 164 is not connected to controller 160 at the corresponding connection pin (i.e., the corresponding connection pin is left empty), the predetermined drop will not be detected. In other words, an absence of the predetermined voltage drop will be detected.

Although a single individual display component 164 and corresponding connection pin are illustrated in FIG. 4, multiple individual display components 164 or connection pins may be provided, as would be understood in light of the present disclosure. The connection pins may correspond to a predetermined plurality of potential electrical elements (e.g., electrical elements that might possibly be connected to controller 160). For instance, the total number of connection pins on controller 160 may be based on the number of possible display components 164 (e.g., the maximum number of display components 164 included on any model in which the controller 160 may be installed). Thus, models of dishwasher that have a number of display components 164 that is fewer than the number of possible display components 164 may have be assembled to have certain connection pins empty. In other words, certain predetermined connection pins may be left empty or a certain predetermined number of the connection pins may be left empty. During or as part of certain operations (e.g., an initial operation), controller 160 may thus detect or determine which connection pins or how many connection pins are either filled or empty. Once controller 160 determines the filled or empty connection pins, the determination may be stored or recorded (e.g., within the memory of controller 160).

Returning generally to FIGS. 1, 2, and 4, the processor of controller 160 is configured to execute programming instructions stored in memory. For instance, a set of programming instructions may correspond to a specific personality stored in memory. In some embodiments, multiple discrete preset personalities (e.g., programming instructions) corresponding different models for embodiments of the dishwasher 100 are stored in memory. Controller 160 may be a control board configured to automatically (e.g., without direct input or selections from the user or service professional) select or initiate one of the plurality of preset personalities as the operating personality for the dishwasher 100. Each of the plurality of preset personalities may direct certain elements to operate uniquely (e.g., in response to user selection or mode). As an example, each personality may include different settings for rotation speed of circulation motor 155 or drain motor 169. Thus, the rotation speed of pump motor 155 or 169 may be determined, at least in part, by the one of the preset personality settings that is selected as the operating personality setting. As an additional or alternative example, each personality may include different settings or directions for actuating diverter 156. Thus, the actuation of diverter 156 may be determined, at least in part, by the one of the preset personality settings that is selected as the operating personality setting.

It should be appreciated that the present subject matter is not limited to any particular style, model, or configuration of dishwasher 100. The exemplary embodiment depicted in the above-discussed figures is for illustrative purposes only. For example, different locations may be provided for user interface 162, different configurations may be provided for rack assemblies 122, 124, 126, different spray arm assemblies and spray manifold configurations may be used, different motor configurations (e.g., for circulation pump 152 or drain pump 168), and other differences may be applied while remaining within the scope of the present subject matter.

Figure 3:
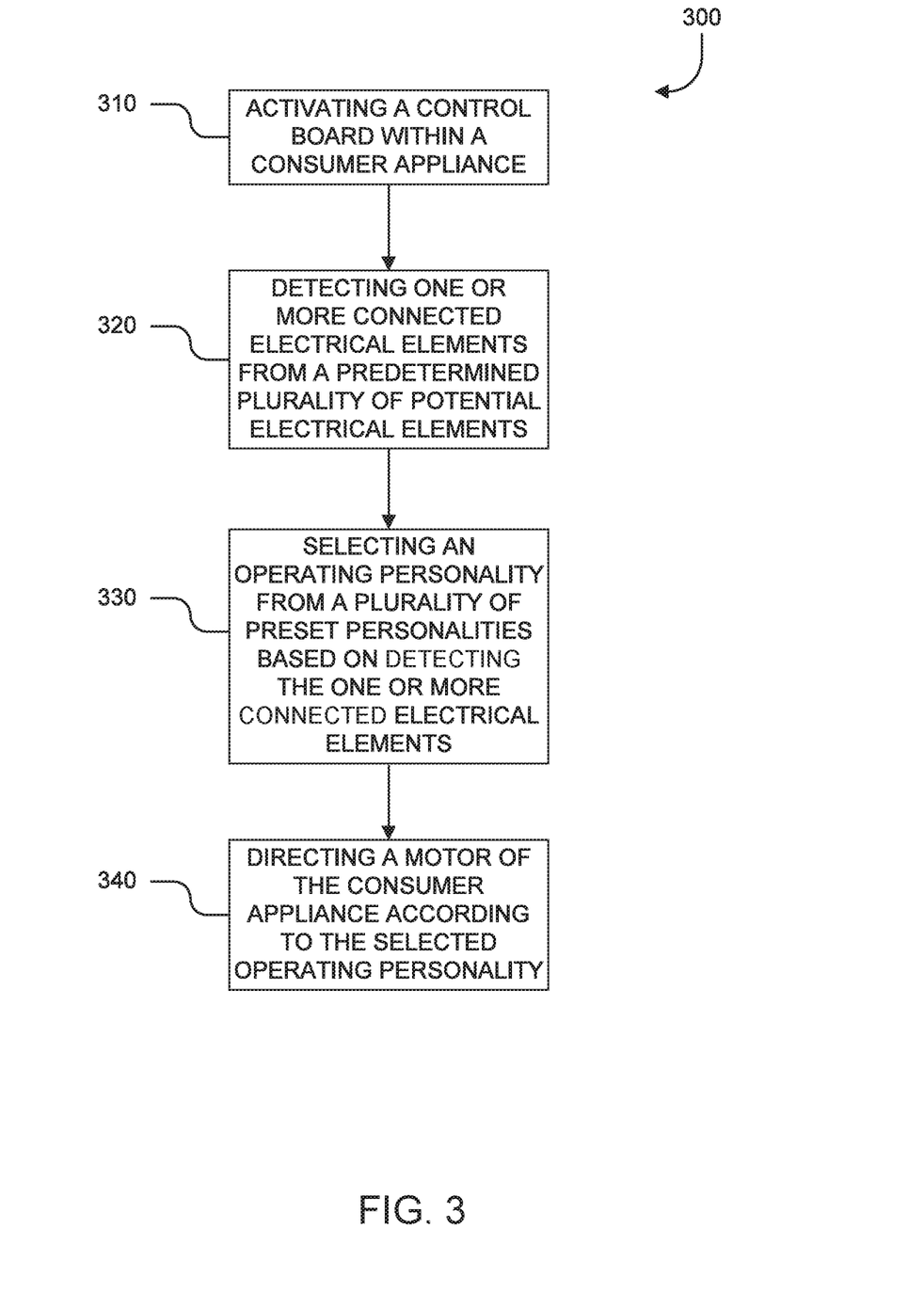
FIG. 3 provides a flow chart of a method for directing operation of a dishwashing appliance according to exemplary embodiments of the present disclosure.

Turning now to FIG. 300, methods (e.g., method 300) for operating a consumer appliance are illustrated. Method 300 may be used to operate any suitable consumer appliance (e.g., dishwashing appliance, refrigerator appliance, oven appliance, microwave appliance, washing machine appliance, dryer appliance, etc.). As an example, some or all of method 300 may be used to operate dishwasher 100 (FIG. 1). The controller 160 (FIG. 2) may be programmed to implement some or all of method 300 (e.g., as or as part of an initial operation).

Advantageously, the present methods may simplify installation of a control board. In particular, assembled within a consumer appliance the control board may automatically determine and select a corresponding personality setting without requiring direct input or knowledge from a user or installer. In exemplary embodiments, the control board or controller 160 may be operable to perform various steps of a method in accordance with the present disclosure.

As shown, at 310, the method 300 includes activating a control board within the consumer appliance (e.g., dishwashing appliance). The activation may be made, for instance, in response to electrical power being supplied to the consumer appliance (e.g., for the first time or following an extended period without power). Activation may thus include supplying power to the control board along with the rest of the consumer appliance (e.g., from a municipal power source or grid).

In some embodiments, 310 includes directing an initial current through one or more connection pins. For instance, the initial current may be directed at a preset voltage. As described above, the connection pins may correspond to a predetermined plurality of potential electrical elements (e.g., electrical elements that could possibly be connected to the control board). In some such embodiments, each connection pin may correspond to a discrete potential electrical element.

For the purposes of the method 300, the predetermined plurality of potential electrical elements may represent possible electrical elements that may vary (e.g., in type or number) between different models of the same consumer appliance. In certain embodiments, the predetermined plurality of potential electrical elements may include or be provided as a plurality of diodes. For example, the diodes may correspond to a plurality of light emitting diodes within the user interface, as described above. Optionally, each potential electrical element of the predetermined plurality of potential electrical elements is a light emitting diode.

At 320, the method 300 includes detecting one or more connected electrical elements from a predetermined plurality of potential electrical elements. Generally, the detection at 320 may follow (e.g., occur subsequent to) 310. Optionally, a predicted voltage reading is provided for a predetermined connection pin of the control board. The predicted voltage may correspond to the connection pin being filled or empty, as described above. In some such embodiments, 320 includes detecting the predicted voltage reading at the predetermined connection pin of the control board. For instance, a connected electrical element may be detected if and when the voltage of an initial current has been reduced by a predetermined voltage drop to generate the predicted voltage reading.

At 330, the method 300 includes selecting an operating personality from a plurality of preset personalities based on the one or more detected electrical elements. The selection may be based on a total number of detected electrical elements from 320 or on which specific electrical elements are detected at 320.

As an example, if the selection at 330 is based on the total number of detected electrical elements, the method 300 may further include determining a number of detected electrical elements (i.e., how many electrical elements of the potential electrical elements are detected as being connected at 320). Once the number of detected electrical elements is determined, 330 may include selecting the personality that corresponds to the number of detected electrical elements.

As an additional or alternative example, if the selection at 330 is based on the which electrical elements that are detected, 330 may include selecting the personality that corresponds to the specific electrical elements that are detected. For example, detecting a particular connection pin is filled may indicate a corresponding personality is appropriate.

In optional embodiments, the method 300 further includes storing the selected operating personality (e.g., within the memory of the controller). Thus, subsequent operations may avoid repeating the detection and selection of an operating personality.

At 340, the method 300 includes directing a motor of the consumer appliance according to the selected operating personality. As described above, different personalities may correspond to different models of the consumer appliance, which may include different motors (e.g., pump motors mounted within a dishwashing appliance). One or more of the different possible motors may vary by presence, size, load capacity, type, etc. The operations for which the motor is activated, times for which the motor is activated (e.g., lengths of time during a particular operation), or the voltage at which the motor is operated may be varied according to the personality. Thus, the control board may direct the motor as would be appropriate for that particular model of consumer appliance.

Separate from or in addition to the motor, other suitable features may be directed according to the selected operating personality, as described above and as would be understood in light of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a consumer appliance comprising:
    activating a control board within the consumer appliance;
    detecting one or more connected electrical elements from a predetermined plurality of potential electrical elements connected to the control board at a corresponding plurality of connection pins;
    selecting an operating personality from a plurality of preset personalities based on detecting the one or more connected electrical elements; and
    directing a motor of the consumer appliance according to the selected operating personality,
    wherein the plurality of connection pins defines a total number of selectively-filled connection pins determining a total number of possible electrical components, and wherein selecting the operating personality is based on one or more empty pins of the total number of selectively-filled connection pins.

2. The method of claim 1, wherein activating the control board comprises directing an initial current through one or more connection pins corresponding to the predetermined plurality of potential electrical elements prior to detecting the one or more connected electrical elements.

3. The method of claim 1, wherein detecting one or more connected electrical elements comprises detecting a predicted voltage reading at a predetermined connection pin of the control board.

4. The method of claim 1, wherein the predetermined plurality of potential electrical elements comprises a plurality of diodes.

5. The method of claim 4, wherein the plurality of diodes correspond to a plurality of light emitting diodes within a user interface of the consumer appliance.

6. The method of claim 1, wherein each potential electrical element of the predetermined plurality of potential electrical elements is a light emitting diode.

7. The method of claim 1, further comprising determining a number of detected one or more electrical elements, wherein selecting the operating personality is based on the determined number of detected one or more electrical elements.

8. The method of claim 1, wherein selecting the operating personality is based on which one or more connected electrical elements are detected.

9. The method of claim 1, wherein the consumer appliance is a dishwashing appliance, and wherein the motor is a pump motor mounted within the dishwashing appliance.

10. The method of claim 9, wherein the dishwashing appliance comprises a door rotatably mounted to a cabinet, wherein the door holds a user interface comprising a plurality of connected light emitting diodes, and wherein the predetermined plurality of potential electrical elements comprises a plurality of potential light emitting diodes.

11. A consumer appliance comprising:
a cabinet;
a user interface attached to the cabinet, the user interface comprising one or more connected electrical elements;
a motor mounted within the cabinet; and
a control board in electrical communication with the user interface and the motor, the control board comprising a plurality of connection pins at which the one or more connected electrical elements are connection, the control board being configured to initiate an initial operation comprising
activating the control board,
detecting the one or more connected electrical elements from a predetermined plurality of potential electrical elements,
selecting an operating personality from a plurality of preset personalities based on detecting the one or more connected electrical elements, and
directing the motor according to the selected operating personality,
wherein the plurality of connection pins defines a total number of selectively-filled connection pins determining a total number of possible electrical components, and wherein selecting the operating personality is based on one or more empty pins of the total number of selectively-filled connection pins.

12. The consumer appliance of claim 11, wherein the control board comprises a plurality of connection pins corresponding to the predetermined plurality of potential electrical elements, wherein activating the control board comprises directing an initial current through one or more connection pins of the plurality of connection pins prior to detecting the one or more connected electrical elements.

13. The consumer appliance of claim 11, wherein detecting the one or more connected electrical elements comprises detecting a predicted voltage reading at a predetermined connection pin of the control board.

14. The consumer appliance of claim 11, wherein the predetermined plurality of potential electrical elements comprises a plurality of diodes.

15. The consumer appliance of claim 14, wherein the plurality of diodes correspond to a plurality of light emitting diodes within the user interface.

16. The consumer appliance of claim 11, wherein each potential electrical element of the predetermined plurality of potential electrical elements is a light emitting diode.

17. The consumer appliance of claim 11, wherein the initial operation further comprises determining a number of detected one or more electrical elements, wherein selecting the operating personality is based on the determined number of detected one or more electrical elements.

18. The consumer appliance of claim 11, wherein selecting the operating personality is based on which one or more connected electrical elements are detected.

19. The consumer appliance of claim 11, wherein the consumer appliance is a dishwashing appliance, and wherein the motor is a pump motor.

20. The consumer appliance of claim 19, wherein the dishwashing appliance further comprises a door rotatably mounted to the cabinet, wherein the user interface is mounted within the door, wherein the one or more connected electrical elements comprises a plurality of connected light emitting diodes, and wherein the predetermined plurality of potential electrical elements comprises a plurality of potential light emitting diodes.

* * * * *